(12) United States Patent
Ishizawa et al.

(10) Patent No.: US 7,639,440 B2
(45) Date of Patent: Dec. 29, 2009

(54) CAMERA MODULE

(75) Inventors: Takashi Ishizawa, Yamagata (JP); Tomohiko Osaka, Yamagata (JP)

(73) Assignee: Mitsumi Electric Co., Ltd. (JP)

( * ) Notice: Subject to any disclaimer, the term of this patent is extended or adjusted under 35 U.S.C. 154(b) by 163 days.

(21) Appl. No.: 11/846,442

(22) Filed: Aug. 28, 2007

(65) Prior Publication Data

US 2008/0266682 A1 Oct. 30, 2008

(30) Foreign Application Priority Data

Aug. 31, 2006 (JP) ............................. 2006-236884

(51) Int. Cl.
*G02B 7/02* (2006.01)
(52) U.S. Cl. ..................... 359/824; 359/822; 359/814; 359/694
(58) Field of Classification Search .................. 359/824
See application file for complete search history.

(56) References Cited

U.S. PATENT DOCUMENTS

| | | | |
|---|---|---|---|
| 4,472,024 A | * | 9/1984 | Konomura et al. ........... 359/814 |
| 4,601,539 A | | 7/1986 | Watanabe |
| 4,634,221 A | | 1/1987 | Hoepfner |
| 5,228,017 A | * | 7/1993 | Matsuzaki et al. ....... 369/44.15 |
| 5,289,318 A | | 2/1994 | Sekine |
| 5,519,677 A | * | 5/1996 | Shibata et al. ............ 369/44.16 |
| 5,875,166 A | * | 2/1999 | Ikegame et al. ......... 369/112.23 |
| 2006/0028320 A1 | | 2/2006 | Osaka |

FOREIGN PATENT DOCUMENTS

| | | |
|---|---|---|
| JP | 2004280031 A | 10/2004 |
| WO | 2005088153 A | 9/2005 |

* cited by examiner

*Primary Examiner*—Jessica T Stultz
(74) *Attorney, Agent, or Firm*—Marger Johnson & McCollom, P.C.

(57) ABSTRACT

A camera module includes upper and lower leaf springs having a stable load characteristic and a holder displaceably held by the leaf springs so that the holder can be stably displaced within a magnetic circuit. The upper spring has an outer annular portion, an inner annular portion provided inside the outer annular portion so as to be displaceable with respect to the outer annular portion and attached to the holder, and a plurality of bridge portions coupled between the outer annular portion and the inner annular portion. The camera module further includes a bridge portion supporting member for supporting a part of at least one of the plurality of bridge portions so that a load characteristic of the leaf spring can be changed.

6 Claims, 12 Drawing Sheets

CAMERA MODULE

BACKGROUND OF THE INVENTION

1. Field of the Invention

This invention relates to a camera module, and more specifically to a camera module that can be used in small-sized electronic apparatuses such as digital cameras, camera-equipped cellular phones and the like.

2. Description of the Prior Art

A camera module having a function of displacing a lens unit in a direction of an optical axis of the lens unit is used in relatively small-sized digital cameras and camera-equipped cellular phones and the like. This function is used for providing an autofocus function and/or zoom function and the like, and is achieved by an interaction between a magnetic field generated by an electrical current flowing in a coil and a magnetic field generated by a yoke and magnets provided on the yoke.

Such a camera module includes a barrel which holds the lens unit, a holder which houses the barrel therein, and a pair of leaf springs for supporting the holder so that the holder is displaceable in a direction of an optical axis of the lens unit.

FIG. 11 is an exploded perspective view of an autofocus actuator assembly 100 used in a conventional camera module for displacing a lens unit (not shown) in a direction of an optical axis thereof. It is to be noted that an imaging element (not shown) is provided below a base 111 of the actuator assembly 100.

A holder 108 that houses a barrel (not shown) holding the lens unit is provided between a cover 101 and the base 111 so that the holder 108 is displaceable in a direction of an optical axis of the lens unit together with the lens unit.

An inner annular portion 104b of an upper leaf spring 104 and an inner annular portion 110b of a lower leaf spring 110 are attached to the upper and lower cylindrical portions of the holder 108, respectively. Further, an outer annular portion 104a of the upper leaf spring 104 is attached to an upper surface of a yoke 105 which is mounted on the base 111 and an outer annular portion 11a of the lower leaf spring 110 is attached to the base 111, respectively.

Three bridge portions 104c are coupled between the outer annular portion 104a and the inner annular portion 104b of the upper leaf spring 104. As is the same with the upper leaf spring 104, three bridge portions 110c are coupled between the outer annular portion 11a and the inner annular portion 110b of the lower leaf spring 110. By resilient deformation of the respective three bridge portions 104c and 110c, the holder 108 can be displaced in a direction of an optical axis of the lens unit.

A plurality of magnet pieces 106 are bonded to the yoke 105 so as to produce a magnetic circuit. The yoke 105 has an axial bore 105a for receiving the holder 108. Further, a coil 107 is provided around an outer periphery of the holder 108 so that the coil 7 is disposed in the magnetic field produced by the magnet pieces 106 and the yoke 105 in a state that the holder 108 is received in the axial bore 105a. By supplying a current to the coil 107 to generate a magnetic field, a driving force for displaying the holder 108 in a direction of an optical axis of the lens unit is generated. In this regard, it is to be noted that a component denoted by the reference numeral 103 is a flexible printed circuit board used for supplying a current to the coil 107, a component denoted by the reference numeral 102 is a stopper arranged above the upper surface of the inner annular portion 104a of the upper leaf spring 104, and a component donated by the reference numeral 109 is a plate provided between the lower leaf spring 110 and the bottom surface of the yoke 105.

FIG. 12 is a top plan view of the lower leaf spring 110. In this regard, it is to be noted that the upper leaf spring 104 and the lower leaf spring 110 have the common basic structure excepting that the shapes of the outer annular portions 104a, 110a are different from each other. Therefore, in the following description, an explanation will be made only for the lower leaf spring 110, and an explanation for the upper leaf spring 104 is omitted.

As shown in FIG. 12, the lower leaf spring 110 includes a ring-shaped outer annular portion 110a, a ring-shaped inner annular portion 110b arranged inside the outer annular portion 110a through an annular spacing 110f and having the common axis with the outer annular portion 110a, and three bridge portions 110c coupled between the outer annular portion 110a and the inner annular portion 110b for supporting the inner annular portion 104b with respect to the outer annular portion 104a. Each of the bridge portions 104c has an elongated arc shape and provided in the ring-shaped spacing 110f so as to extend along the inner periphery of the outer annular portion 110a and the outer periphery of the inner annular portion 110b through a predetermined angle.

In this regard, it is to be noted that an actuator assembly similar to the actuator assembly 100 having such upper leaf spring 104 and lower leaf spring 110 described above is disclosed in JP-A-No. 2004-280031, for example.

The upper leaf spring 104 and the lower leaf spring 110 are formed from a thin metal plate made of beryllium copper. The thin metal plate is produced through a metal rolling process and it is then subjected to a punching process to form the leaf springs 104, 110. Such a beryllium copper plate has unevenness in its thickness along a direction through which the metal rolling process has been performed. Due to the unevenness of the thickness of the metal plate, there is a problem in that a load characteristic when it is used as the upper leaf spring 104 and the lower leaf spring 110 is not stable. When the leaf springs 104, 110 do not have such a stable load characteristic, an initial response speed and an amount of an initial displacement of the holder 108 when an electrical current is supplied to the coil 107 are not stable, and thus it becomes difficult to precisely control the position of the holder 108.

Further, a load characteristic of the leaf spring is affected by a heat treatment applied during the manufacturing process of the upper leaf spring 104 and the lower leaf spring 110, it is very difficult to obtain a leaf spring having a predetermined load characteristic.

Further, the plurality of magnet pieces 106 provided on the yoke 105 also have minute variations in their thickness. Due to such minute variations in their thickness, there is a case that a distance between each of the magnet pieces 106 and an outer surface of the coil 107 differs. In such a case, there is a problem in that it is not possible to ensure a stable driving force of the holder 108 within the magnetic circuit due to differences in magnetic forces applied to the coil 107.

SUMMARY OF THE INVENTION

The present invention has been made in view of the problems described above, and therefore it is an object of the present invention is to provide a camera module which includes leaf springs having a stable load characteristic and a holder displaceably held by the leaf springs so that the holder can be stably displaced within a magnetic circuit.

In order to achieve the object, the present invention is directed to a camera module, which comprises: a lens unit which constitutes an optical system of the camera module; a holder which houses the lens unit and is displaceable along an optical axis direction of the lens unit; a coil provided on the holder; a yoke and magnets provided on the yoke for providing a magnetic field to the coil; at least one leaf spring for supporting the holder, the leaf spring including an outer annular portion, an inner annular portion provided inside the outer annular portion so as to be displaceable with respect to the outer annular portion and attached to the holder, and a plurality of bridge portions coupled between the outer annular portion and the inner annular portion; an imaging element provided below the lens unit; and bridge portion supporting means for supporting a part of each of the plurality of bridge portions so that a load characteristic of the leaf spring can be changed.

The camera module of the present invention is provided with the bridge portion supporting means which can change a load characteristic of the leaf spring by supporting a selected region of each of the bridge portions of the leaf spring. Therefore, even in the case where a load characteristic of the leaf spring is not identical to a predetermined load characteristic due to unevenness in the thickness of a metal plate from which the leaf spring is formed and/or undesirable affect from a heat treatment or even in the case where there are minute variations in the thickness of each of the magnet pieces, it is possible to apparently adjust the spring constant of the leaf spring by using the bridge portion supporting means to thereby make it possible for the leaf spring to have the predetermined load characteristic, and as a result thereof it is possible to ensure a stable driving force of the holder in the magnetic circuit. Further, since the bridge portion supporting means of the camera module of the present invention is configured so as to support a selected region of the bridge portion of the leaf spring, it is also possible to make the leaf spring have the predetermined load characteristic by adjusting the effective deformable length of the bridge portion. This also makes it possible to ensure a stable driving force of the holder in the magnetic circuit.

In the camera module of the present invention, it is preferred that the bridge portion supporting means includes a ring-shaped annular portion and supporting portions which protrude inside the annular portion so as to support the bridge portions, and the bridge portion supporting means rotatably and concentrically provided with respect to the leaf spring so that the load characteristic of the leaf spring can be changed.

With this structure, it is possible to adjust a load characteristic of the leaf spring only by rotating the bridge portion supporting means.

Further, in the camera module of the present invention, it is also preferred that the supporting parts of the bridge portion supporting means are formed so as to have resiliency.

With this structure, by adding a spring constant of the supporting part to a spring constant of the bridge portion of the leaf spring, it is possible to apparently change the spring constant of the leaf spring.

Furthermore, in the camera module of the present invention, it is also preferred that each of the supporting parts of the bridge portion supporting means has an extending part which extends from each supporting part along the extending direction of the bridge portion of the leaf spring.

With this structure, by appropriately selecting an extending length of the extending part, it is possible to easily adjust the resiliency of the supporting part.

Furthermore, in the camera module of the present invention, it is also preferred that the bridge portion supporting means serves as a magnetic flux blocking member which blocks leakage of magnetic flux from the yoke.

With this structure, since it is not necessary to provide an additional component for a magnetic flux blocking member, a number of necessary components can be reduced.

Moreover, in the camera module of the present invention, it is also preferred that the leaf spring is rotatably supported on the bridge portion supporting means.

With this structure, it possible for the bridge portion supporting means to have other function such as the magnetic flux blocking member as described above.

The above and other objects, features and advantages of the present invention will be apparent from the following description when taken in conjunction with the accompanying drawings which illustrate preferred embodiments of the present invention by way of example.

DETAILED DESCRIPTION OF THE PREFERRED EMBODIMENTS

Figure 1:
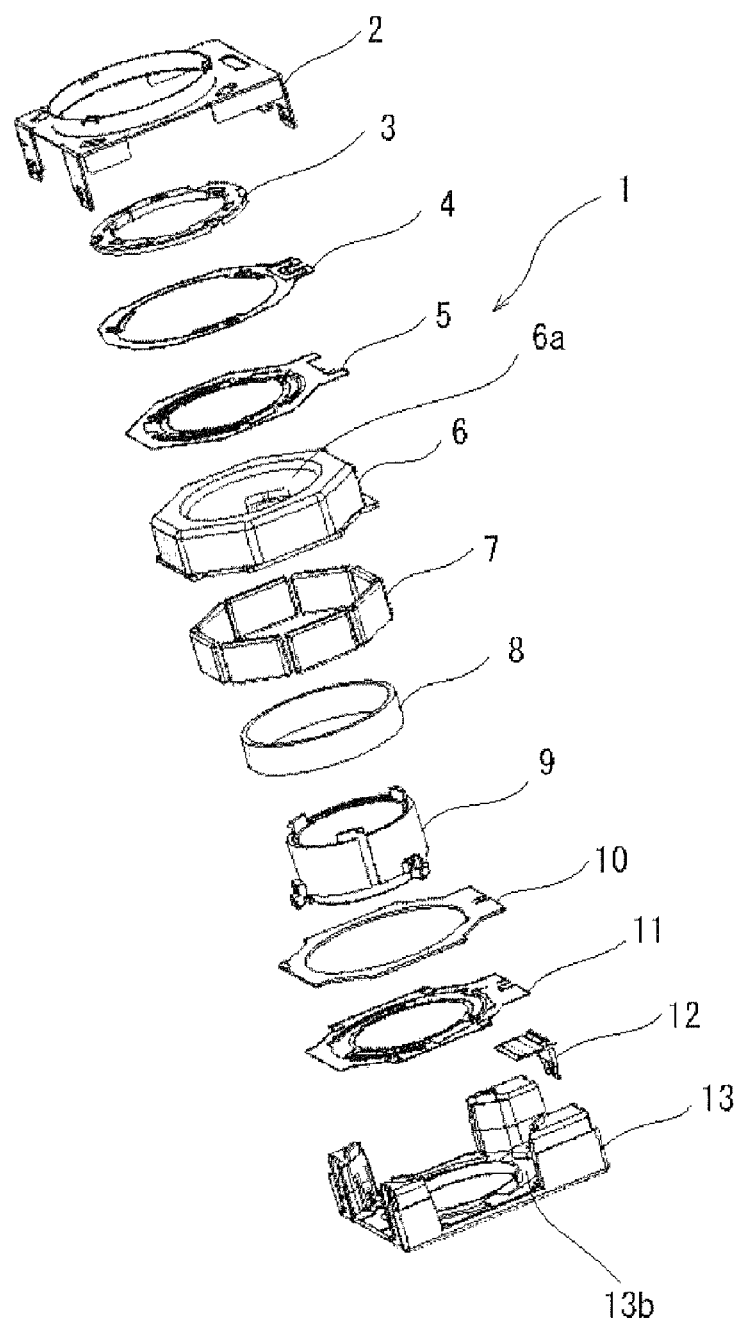
FIG. 1 is an explored perspective view of an actuator assembly 1 of a camera module according to an embodiment of the present invention.

A camera module according to an embodiment of the present invention will be described below with reference to the accompanying drawings.

The camera module according to the embodiment includes a lens unit (not shown in the drawings) which constitutes an optical system of the camera module; a holder 9 which houses the lens unit and is displaceable along an optical axis direction of the lens unit; a coil 8 provided on the holder 9; a yoke 6 and a plurality of magnets 7 provided on the yoke 6 for providing a magnetic field to the coil 8; an upper leaf spring 5 for supporting the holder 9, the leaf spring 5 including an outer annular portion 5a, an inner annular portion 5b provided inside the outer annular portion 5a so as to be displaceable with respect to the outer annular portion 5a and attached to the holder 8, and a plurality of bridge portions 5c coupled between the outer annular portion 5a and the inner annular portion 5b; and an imaging element (not shown in the drawing) provided below the lens unit; wherein the camera module is characterized by further providing a bridge portion supporting member 4 which serves as bridge portion supporting means for supporting a part of at least one of the plurality of bridge portions 5c of the upper leaf spring 5 so that a load characteristic of the upper leaf spring 5 can be changed. Note that a lower leaf spring 10 and a bridge portion supporting member 11 described later also have this feature.

Hereinbelow, an actuator assembly 1 of the camera module according to the embodiment of the present invention will be described in detail with reference to FIG. 1. In this regard, it is to be noted that the imaging element (not shown) is provided below a base 13.

The holder 9 that houses the barrel (not shown) holding the lens unit is provided in a space defined between a cover 2 and the base 13 so that the holder 9 is displaceable in a direction of an optical axis of the lens unit.

The inner annular portion 5b of the upper leaf spring 5 is attached to the upper end surface of a cylindrical portion of the holder 9. In the same way, the inner annular portion 11b of the lower leaf spring 11 is attached to the lower end surface of the cylindrical portion of the holder 9. The outer annular portion 5a (see FIG. 2) of the upper leaf spring 5 is attached to the upper surface of the yoke 5 and the outer annular portion 11a (see FIG. 8) of the lower leaf spring 11 is attached to the base 10.

Figure 3:
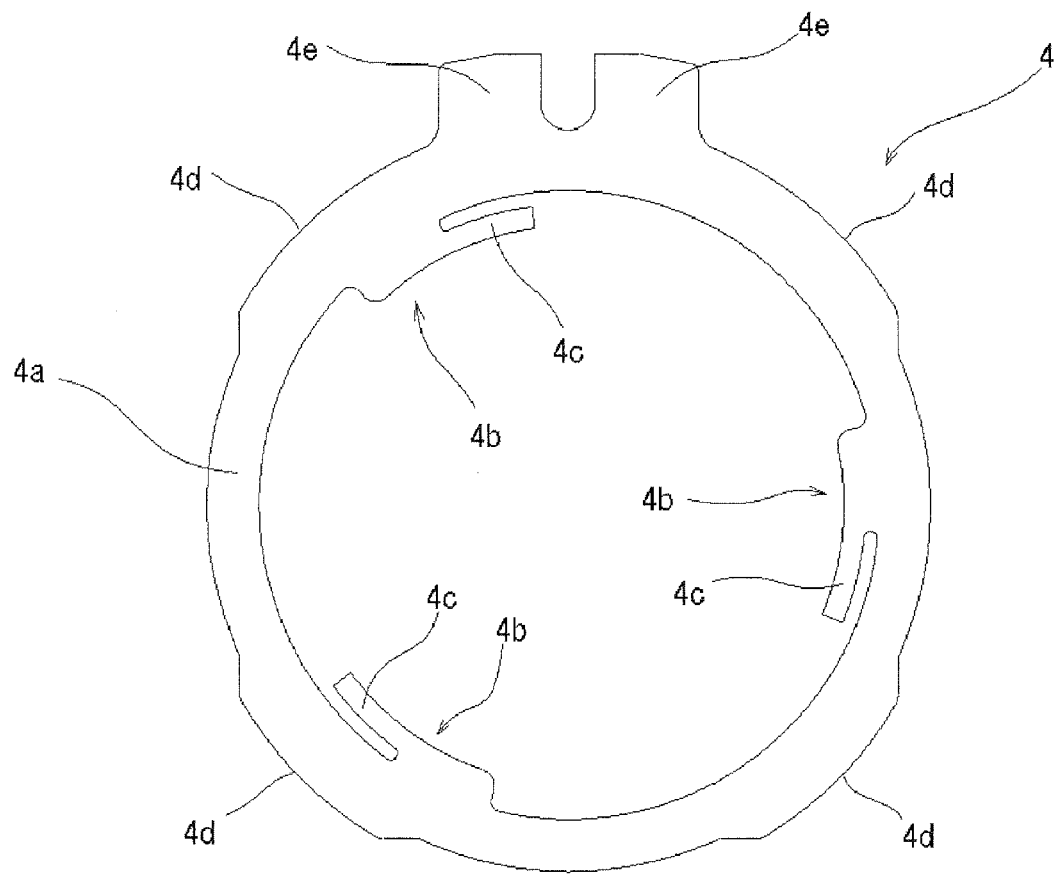
FIG. 3 is a top plan view of a bridge portion supporting member 4 of the camera module shown in FIG. 1.
Figure 6:
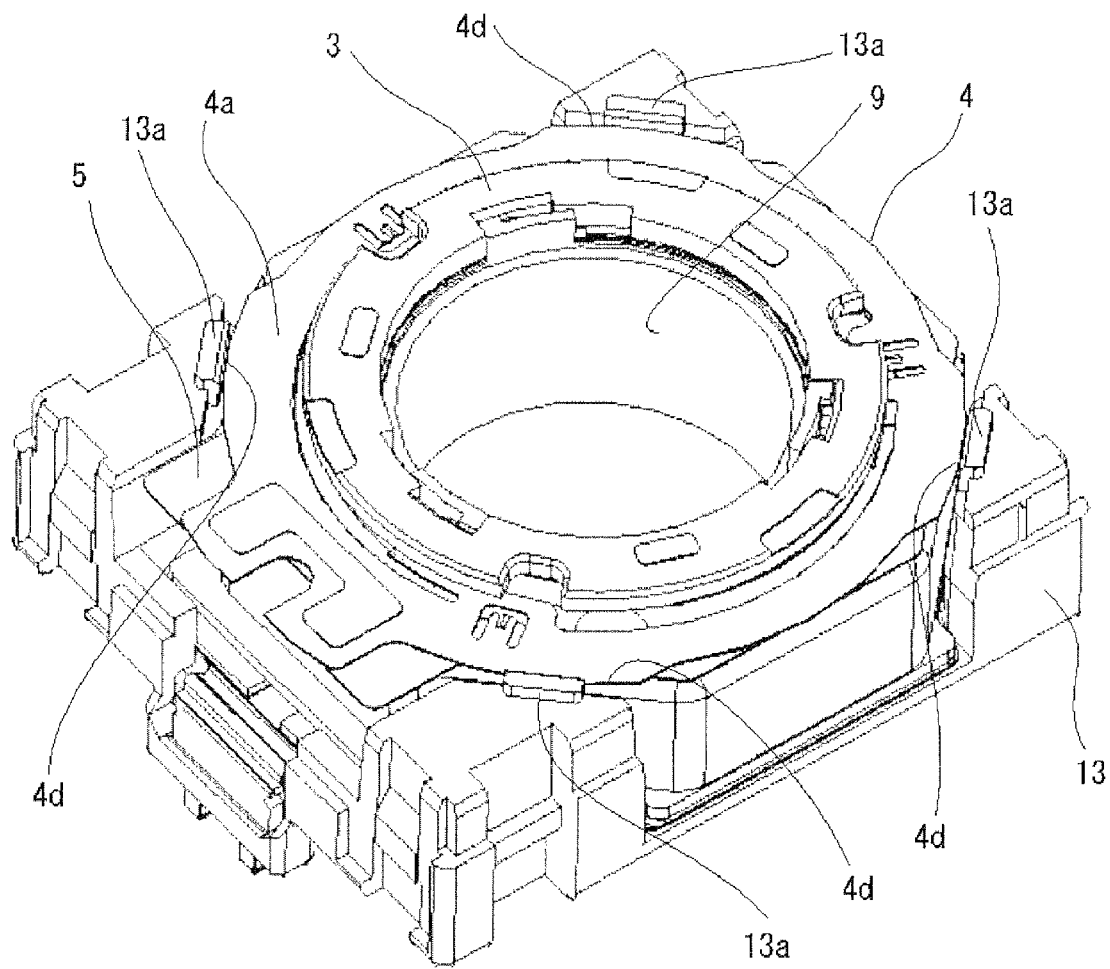
FIG. 6 is a perspective view which shows a state that the upper leaf spring 5 and the bridge portion supporting member 4 of the camera module shown in FIG. 1 are assembled with a base 13.

Between the upper leaf spring 5 and the cover 3, there is provided a bridge portion supporting member 4 which will be described later. As shown in FIG. 3, the bridge portion supporting member 4 includes a ring-shaped annular portion 4a having four outer periphery supporting parts 4d at four locations of the outer periphery of the ring-shaped annular portion 4a. The bridge portion supporting member 4 is rotatably supported on the base 13 with a state that the outer periphery supporting parts 4d are in slidable contact with four posts 13a of the base 13 (see FIG. 6).

Further, between the lower leaf spring 11 and the yoke 6, there is provided a bridge portion supporting member 11 which will be described later. The bridge portion supporting member 11 also has a ring-shaped annular portion 10a (see FIG. 7) which is supported on the base 13.

The plurality of magnet pieces 7 are bonded to the yoke 6 so as to produce a magnetic circuit of the actuator assembly 1. Further, the coil 8 is provided around an outer periphery of the holder 9 so that the coil 7 is disposed in the magnetic field generated by the magnet pieces 7 and the yoke 6. The yoke 6 has an axial bore 6a for receiving the holder 9. The holder 9 can be displaced through the axial bore 6a in a direction of an optical axis of the lens unit by supplying a current to the coil 8. It is noted that a component denoted by the reference numeral 12 is a flexible printed circuit board used for supplying a current to the coil 8, and a component denoted by the reference numeral 2 is a stopper arranged above the upper surface of the inner annular portion 5b (see FIG. 2) of the upper leaf spring 5.

Hereinbelow, referring to FIG. 2 to FIG. 6 a description will be made with regard to the upper leaf spring 5 and the bridge portion supporting member 4.

Figure 2:
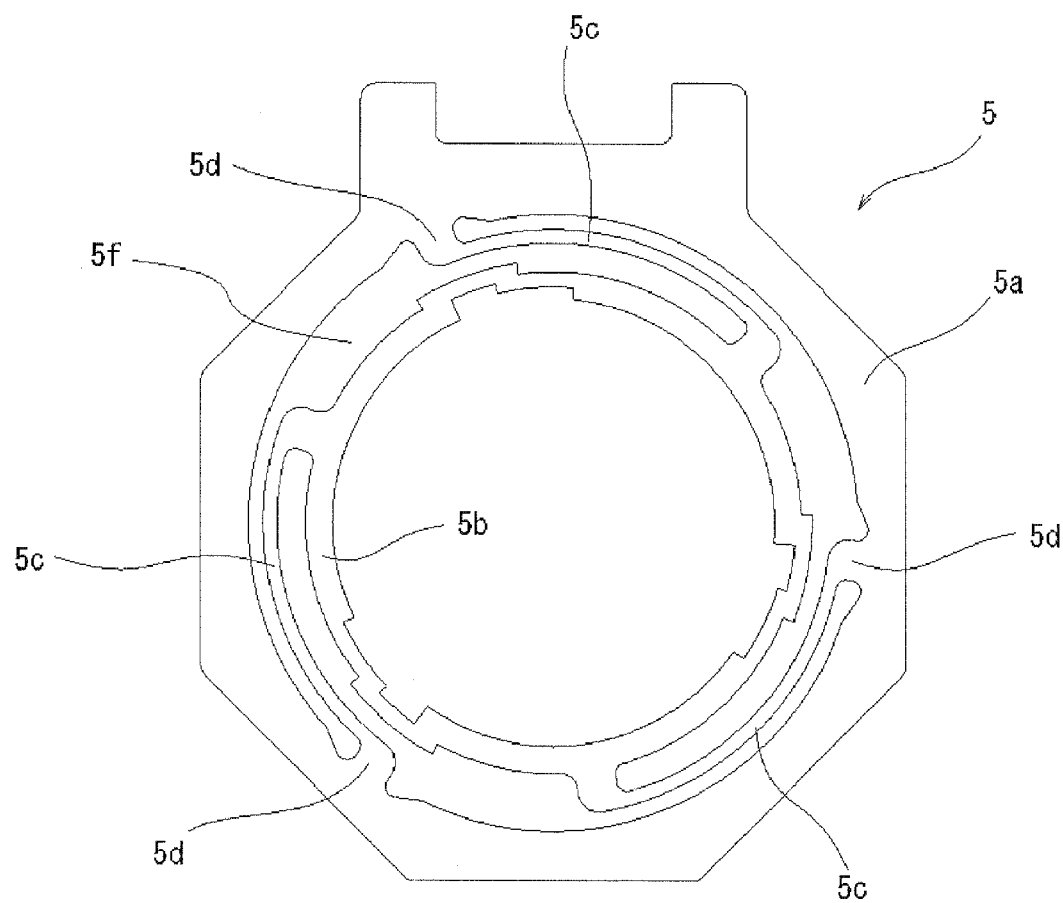
FIG. 2 is a top plan view of an upper leaf spring 5 used in the camera module shown in FIG. 1.

As shown in FIG. 2, the upper leaf spring 5 is formed from a thin metal plate made of beryllium copper through a punching process, and it has the ring-shaped outer annular portion 5a and the ring-shaped inner annular portion 5b which is concentrically provided inside the outer annular portion 5a through a predetermined annular spacing 5f. The inner annular portion 5b is supported by the outer annular portion 5a through the three bridge portions 5c. Each of the bridge portions 5c has an elongated arc-shape, and positioned inside the annular spacing 5f so that it extends along the inner periphery of the outer annular portion 5a and the outer periphery of the inner annular portion 5b through a predetermined angle. Further, each of the bridge portions 5c has an outer annular portion side base part 5d.

As shown in FIG. 3, the bridge portion supporting member 4 is also formed from a thin metal plate made of beryllium copper through a punching process, and it has a ring-shaped annular portion 4a, three L-shaped supporting portions 4b which protrude from an inner periphery of the annular portion 4a so as to support the bridge portions 5c of the upper leaf spring 5, and four outer periphery supporting parts 4d at four locations of the outer periphery of the ring-shaped annular portion 4a. Further, a pair of operation pieces 4e are formed on the annular portion 4a so as to protrude outwardly. The bridge portion supporting member 4 is rotatably and concentrically provided with respect to the upper leaf spring 5. Specifically, although the upper leaf spring 5 is attached to the yoke 6 in a fixed state, the bridge portion supporting member 4 is rotatably supported on the base 13 with a state that the outer periphery supporting parts 4d are in slidable contact with the four posts 13a of the base 13 (see FIG. 6).

Each of the supporting parts 4b of the bridge portion supporting member 4 has size and shape correspond to the outer annular portion side base part 5d of the bridge portion 5c of the upper leaf spring 5. Further, an extending part 4c which extends from the supporting part 4b along the extending direction of the bridge portion 5c of the leaf spring 5.

Figure 4:
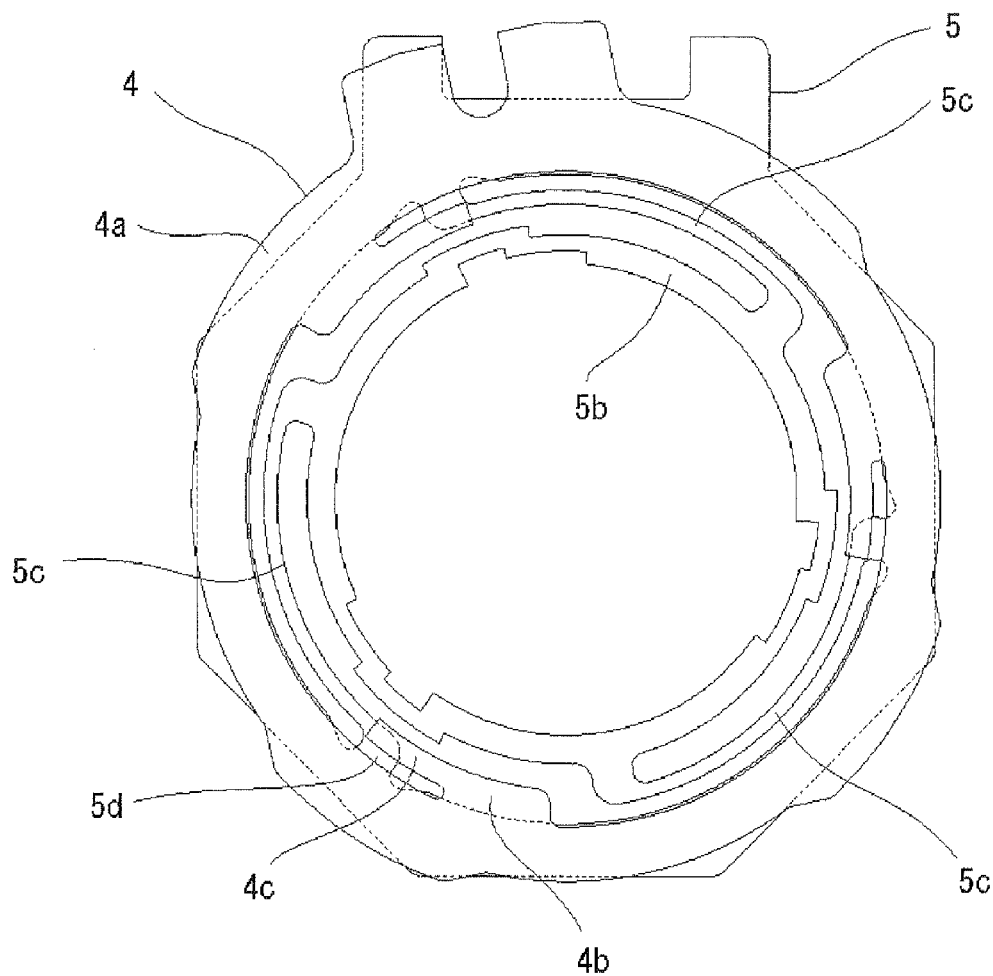
FIG. 4 is an illustration for explaining a state that the bridge portion supporting member 4 of the camera module shown in FIG. 1 is combined with the upper leaf spring 5.
Figure 5:
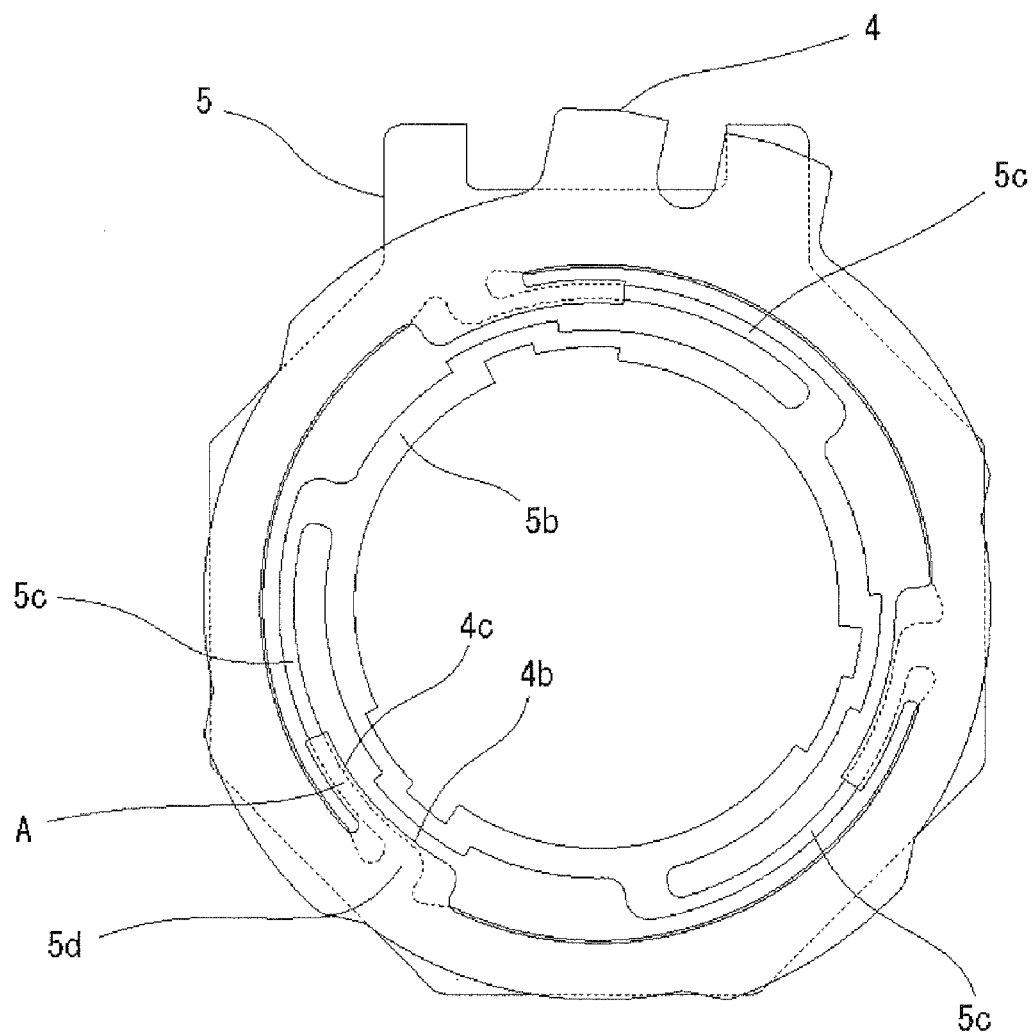
FIG. 5 is an illustration for explaining another state that the bridge portion supporting member 4 of the camera module shown in FIG. 1 is combined with the upper leaf spring 5.

Each of FIGS. 4 and 5 is an illustration for explaining a state that the upper leaf spring 5 is combined with the bridge portion supporting member 4. As shown in FIGS. 4 and 5, the upper spring 5 is not rotatable, while only the bridge portion supporting member 4 is rotatable about the concentric axis with the upper spring 5. FIG. 4 shows a state that the bridge portion supporting member 4 has been rotated in an anti-clockwise direction to a position where each extending part 4c of the supporting part 4b of the bridge portion supporting member 4 is overlapped with the outer annular portion side base part 5d of the corresponding bridge portion 5c of the upper leaf spring 5 by operating the operation pieces 4e with a predetermined gig. In this state, since the extending part 4c supports only the base part 5c of the bridge portion 5c, the bridge portion 5c is in a state of being easily deformable. On the other hand, as the bridge portion supporting member 4 is rotated in a clockwise direction so that the extending part 4c is overlapped with a portion of the bridge portion 5c over the outer annular portion side base part 5d, a region where the extending part 4c is overlapped with the bridge portion 5c (that is, a region indicated by "A" in FIG. 5) is gradually increased. FIG. 5 shows a state that an area of the overlapping region of the extending part 4c and the bridge portion 5c becomes largest.

Next, description will be made with regard to an adjustment operation of a spring constant of the upper leaf spring 5 in assembling the camera module according to this embodiment.

As described above, by rotating the bridge portion supporting member 4 with respect to the upper leaf spring 5, it is possible to change the area of the overlapping region of the extending part 4c and the bridge portion 5c. As the area increases, a spring constant of the extending part 4c is added to the spring constant of the bridge portion 5c according to the increasing of the area. Therefore, though the spring constant of the upper leaf spring being unchanged, the spring constant of the upper leaf spring 5 is apparently increased due to the addition of the spring constant of the extending part 4c. As a result, it is possible to adjust a load characteristic of the upper leaf spring 5. In this regard, it is to be noted that after completion of the adjustment operation described above, the bridge portion supporting member 4 is fixed in the base 13 by bonding a part of the bridge portion supporting member 4 to the base 13.

Hereinbelow, referring to FIG. 7 to FIG. 10 description will be made with regard to the lower leaf spring 11 and the bridge portion supporting member 10.

Figure 8:
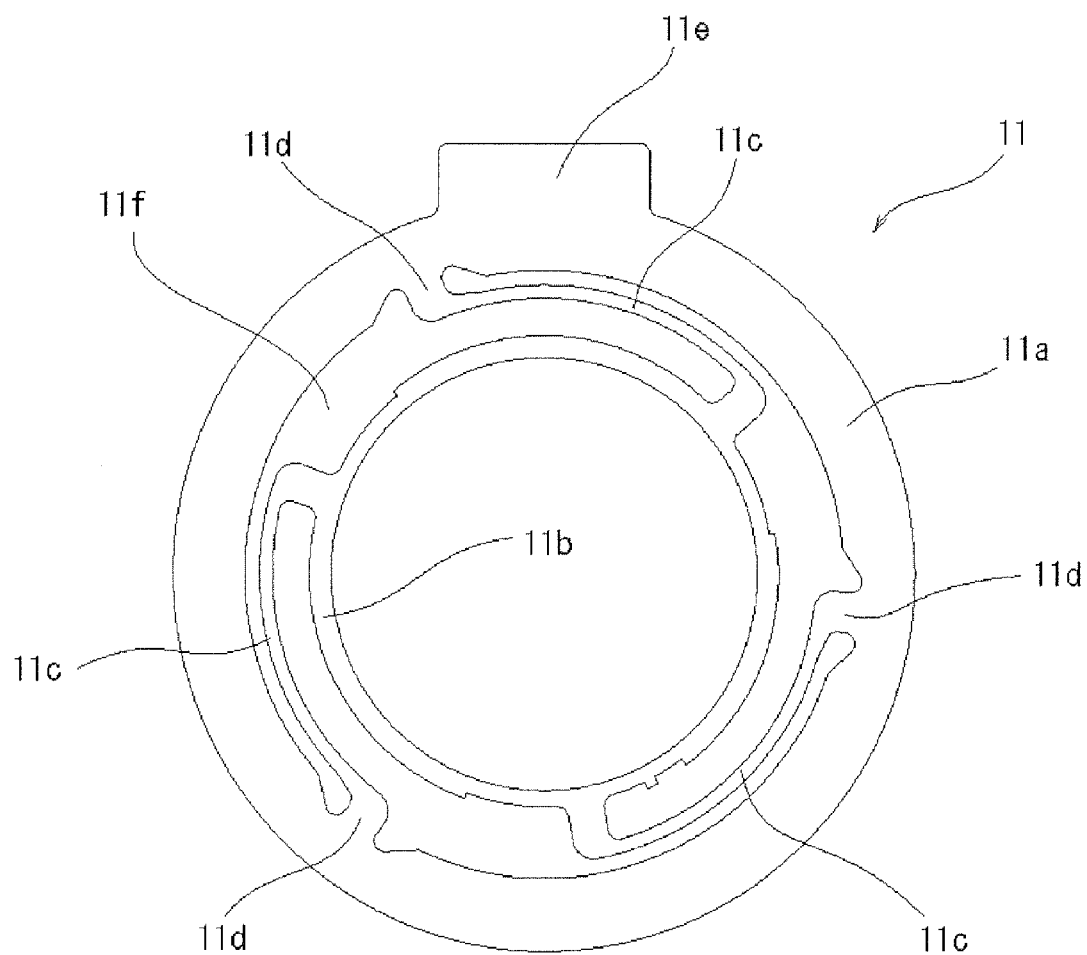
FIG. 8 is a top plan view of a lower leaf spring 11 used in the camera module shown in FIG. 1.

As shown in FIG. 8, the upper leaf spring 11 is formed from a thin metal plate made of beryllium copper through a punching process, and it has the outer annular portion 11a and the inner annular portion 11b which is concentrically provided inside the outer annular portion 11a through a predetermined annular spacing 11f. The inner annular portion 11b is supported by the outer annular portion 11a through the three bridge portions 11c. Each of the bridge portions 11c has an arc-shape, and positioned inside the annular spacing 11f so that it extends along the inner peripheral edge of the outer annular portion 11a and the outer peripheral edge of the inner annular portion 11b through a predetermined angle. Further, each of the bridge portions 11c has an outer annular portion side base part 11d. Furthermore, an operation piece 11e is formed on the annular portion 11a so as to protrude outwardly.

The bridge portion supporting member 10 is rotatably and concentrically provided with respect to the lower leaf spring 11. Specifically, although the bridge portion supporting member 10 is attached to the base 13 in a fixed state, the lower leaf spring 11 is rotatably supported on the base 13 with a state that an outer periphery part is in slidable contact with an annular groove 13b of the base 13 (see FIG. 1).

Figure 7:
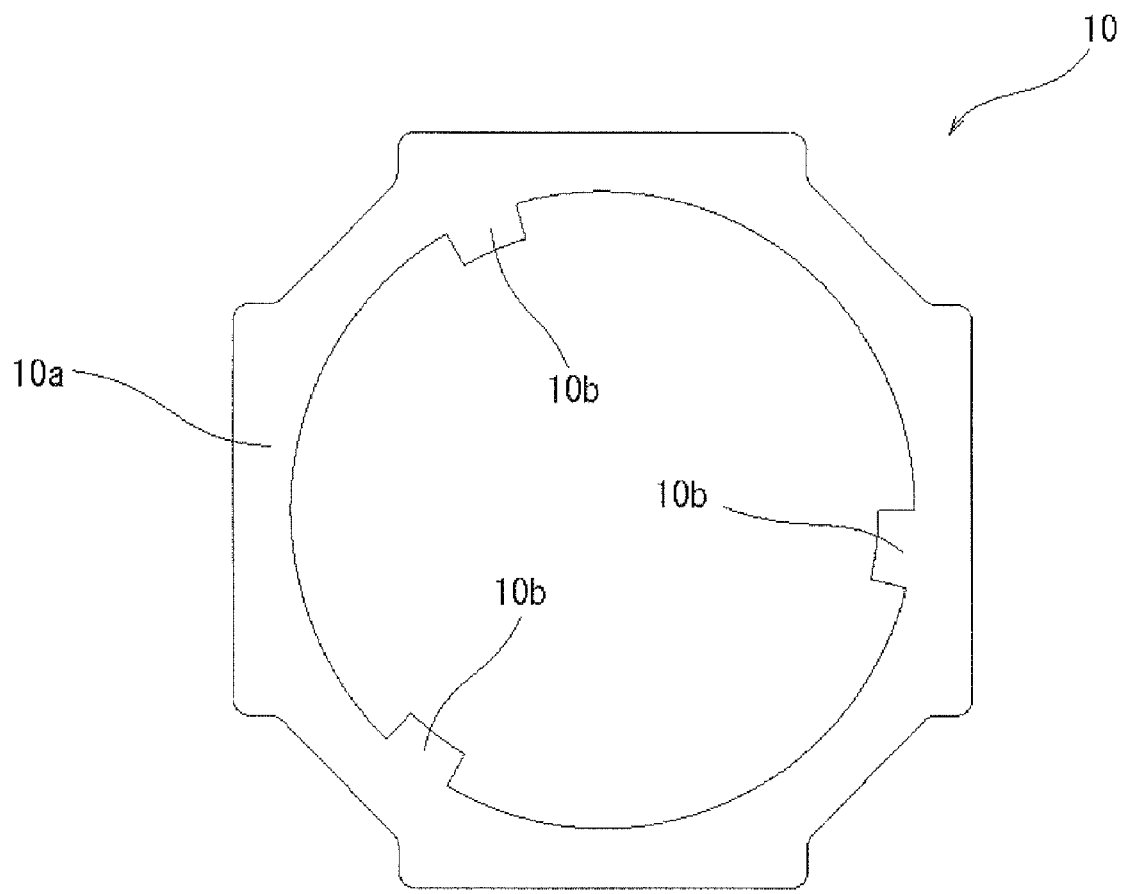
FIG. 7 is a top plan view of the bridge portion supporting member 10 of the camera module shown in FIG. 1.

As shown in FIG. 7, the bridge portion supporting member 10 is formed from a stainless steel plate which is easily magnetized and do not have any resiliency like a leaf spring for a camera module, and the bridge portion supporting member 10 is formed by subjecting such a stainless steel plate to a punching process. The bridge portion supporting member 10 has a ring-shaped annular portion 10a, three supporting portions 10b which protrude from an inner periphery of the annular portion 10a. Each of the supporting portions 10b has size and shape correspond to the outer annular portion side base part 11d of each of the bridge portions 11c.

Figure 9:
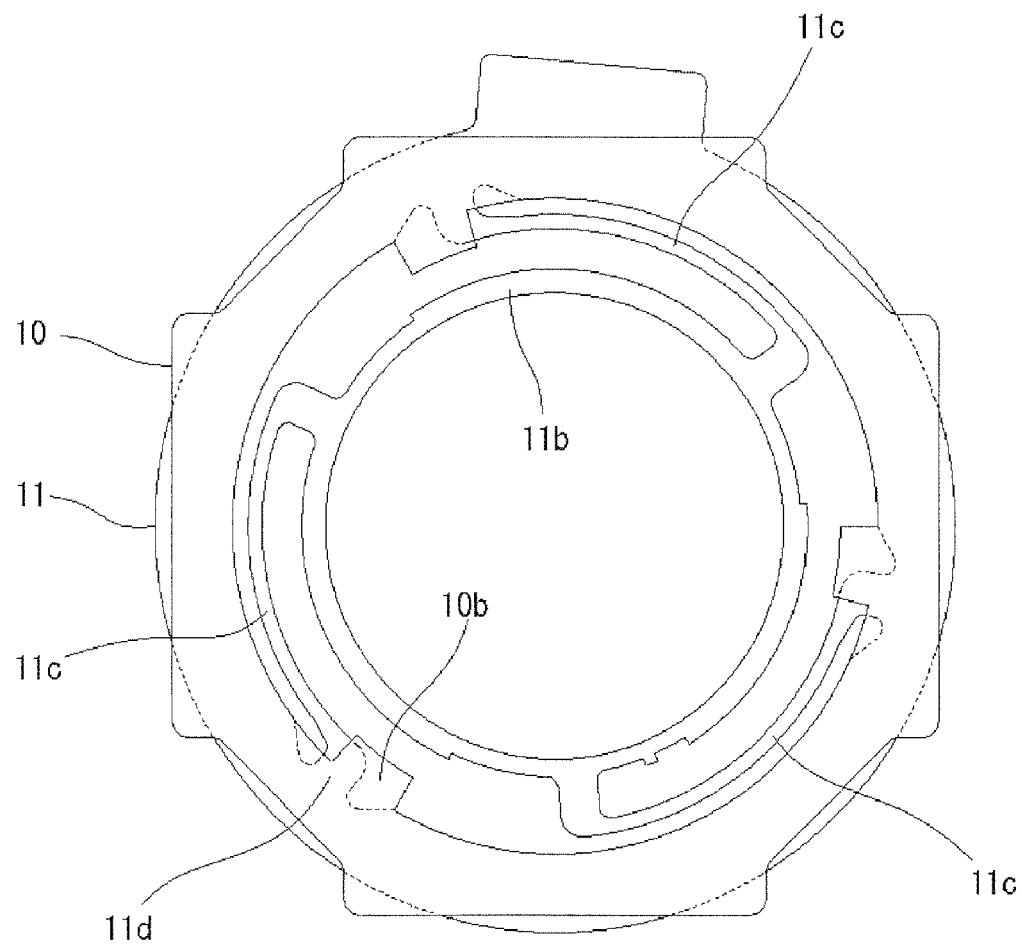
FIG. 9 is an illustration for explaining a state that the bridge portion supporting member 10 of the camera module shown in FIG. 1 is combined with the lower leaf spring 11.
Figure 10:
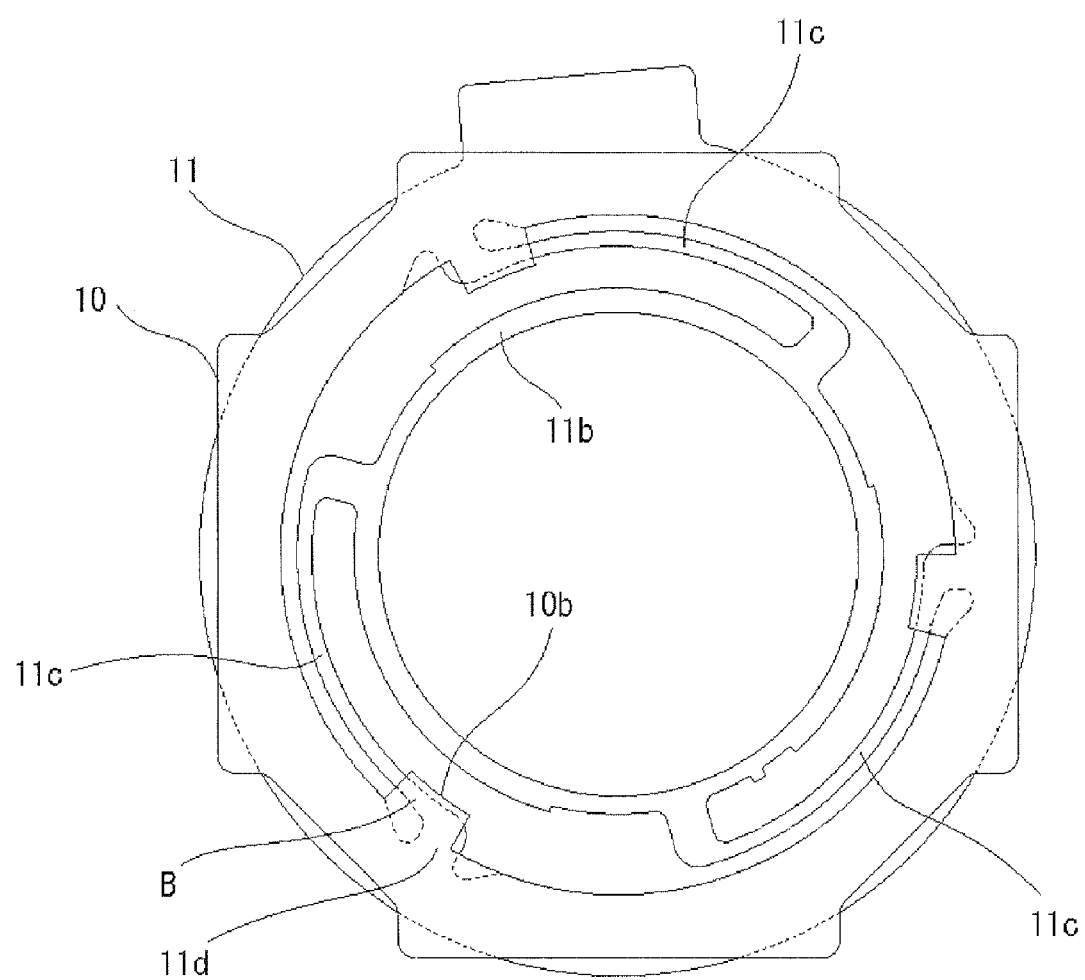
FIG. 10 is an illustration for explaining another state that the bridge portion supporting member 10 of the camera module shown in FIG. 1 is combined with the lower leaf spring 11.
Figure 11:
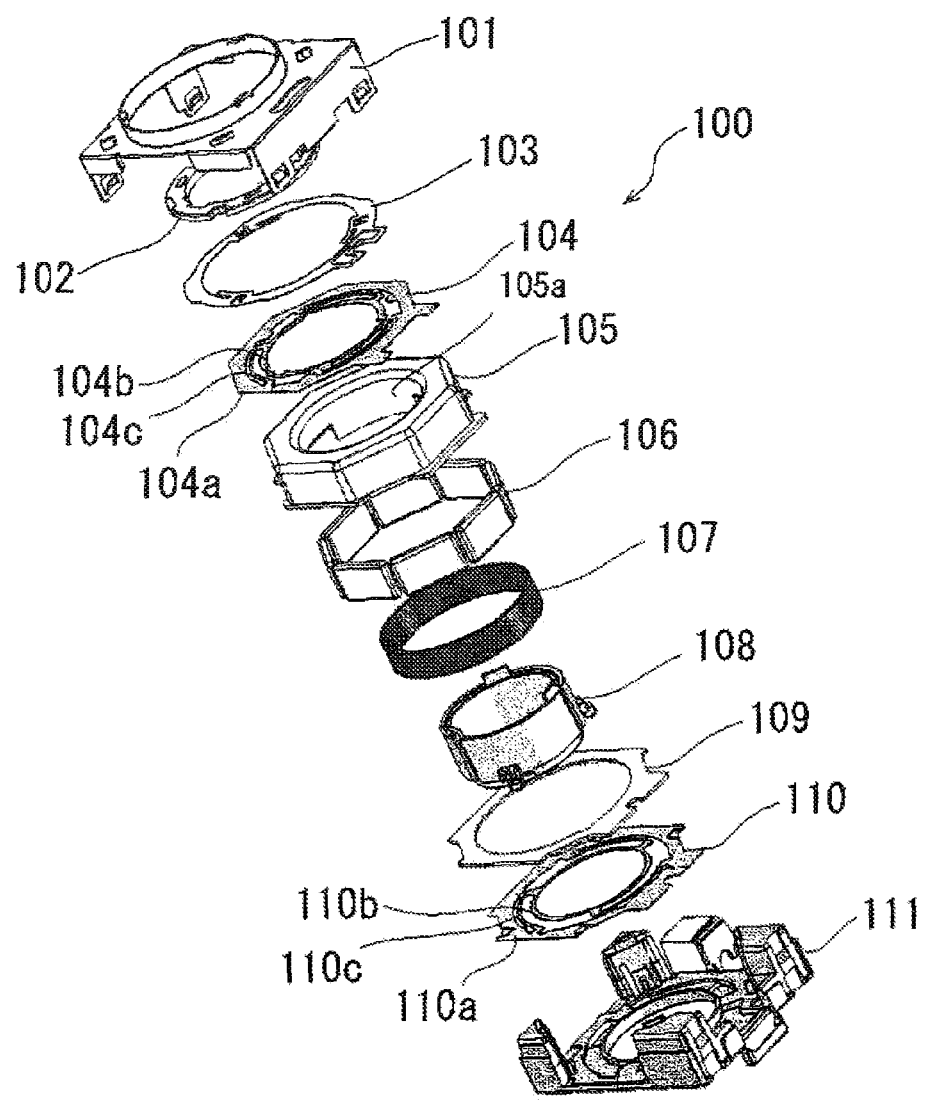
FIG. 11 is an explored perspective view of an actuator assembly 100 of the conventional camera module.
Figure 12:
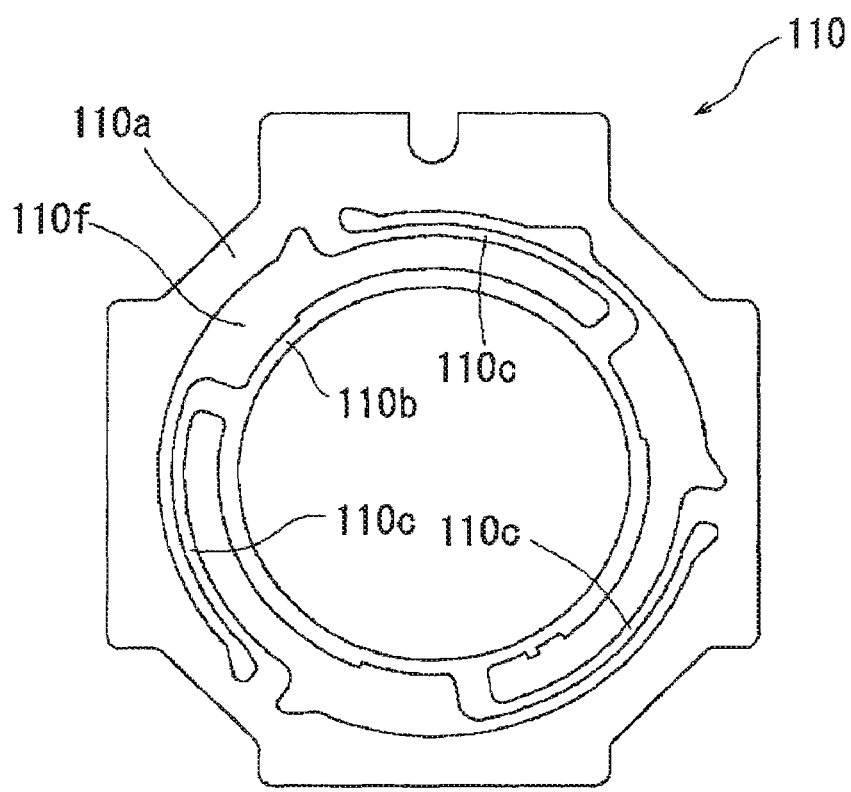
FIG. 12 is a top plan of a lower leaf spring 110 used in the actuator assembly 100 of the conventional camera module.

Each of FIGS. 9 and 10 is an illustration for explaining a state that the lower leaf spring 11 is combined with the bridge portion supporting member 10. As shown in FIGS. 9 and 10, the bridge portion supporting member 10 is not rotatable, while only the lower leaf spring 11 is rotatable about the concentric axis with the bridge portion supporting member 10. FIG. 9 shows a state that the lower leaf spring 11 has been rotated in a clockwise direction to a position where only the outer annular portion side base part 11d of the bridge portion 11c of the lower leaf spring 11 is overlapped with the supporting portion 11b of the bridge portion supporting member 115 by operating the operation piece 11e with a predetermined gig. In this state, since each supporting portion 10b supports only the base part 11c of the bridge portion 11c, a length of a portion of the bridge portion 11c which can be deformed (hereinafter, referred to as "effective deformable length") is longest. On the other hand, as the lower leaf spring 11 is rotated in an anticlockwise direction so that the supporting portion 10b is overlapped with a portion of the bridge portion 11c over the outer annular portion side base part 11d, a region where the supporting portion 10b is overlapped with the bridge portion 11c (that is, a region indicated by "B" in FIG. 10) is gradually increased. FIG. 10 shows a state that an area of the overlapping region of the supporting part 10b and the bridge portion 11c becomes largest, and thus the effective deformable length of the bridge portion 11c is shortest.

Next, description will be made with regard to an adjustment operation of a spring constant of the lower leaf spring 10 in assembling the camera module according to this embodiment.

As described above, by rotating the lower leaf spring 11 with respect to the bridge portion supporting member 10, it is possible to change the area of the overlapping region of the supporting portion 10b and the bridge portion 11c. As the area increases, a length of the effective deformable length of the bridge portion 11c becomes shorter according to the increasing of the area. Therefore, though the length of the bridge portion 11c of the lower leaf spring 11 being unchanged, the effective deformable length of the bridge portion 11c of the lower leaf spring 11 is apparently decreased due to the decreasing of the effective deformable length of the bridge portion 11c. As a result, it is possible to adjust a load characteristic of the lower leaf spring 11. In this regard, it is to be noted that after completion of the adjustment operation described above, the lower spring 11 is fixed to the base 13 by bonding a part of the lower leaf spring 11 to the base 13.

Hereinbelow, the operations and results of the embodiment will be described.

The camera module of this embodiment is provided with the bridge portion supporting member 4 which can change a load characteristic of the upper leaf spring 5 by supporting a selected region of each of the bridge portions 5c of the upper leaf spring 5. Therefore, even in the case where a load characteristic of the upper leaf spring is not identical to a predetermined load characteristic due to unevenness in the thickness of a metal plate from which the upper leaf spring 5 is formed and/or undesirable affect from a heat treatment or even in the case where there are minute variations in the thickness of each of the magnet pieces 7, it is possible to apparently adjust the spring constant of the upper leaf spring 5 by using the bridge portion supporting member 4 to thereby make it possible for the upper leaf spring 5 to have the predetermined load characteristic, and as a result thereof it is possible to ensure a stable driving force of the holder 9 in the magnetic circuit.

Further, since the camera module of this embodiment is also provided with the bridge portion supporting member 10 which can support of a selected region of the bridge portion of the lower leaf spring 11, it is also possible to make the lower spring have the predetermined load characteristic by adjusting the effective deformable length of the bridge portion. This also makes it possible to ensure a stable driving force of the holder 9 in the magnetic circuit.

Further, in the camera module of this embodiment, only the bridge portion supporting member 4 is rotatably and concentrically provided with respect to the upper leaf spring 5. Therefore, it is possible to adjust a load characteristic of the upper leaf spring 5 only by rotating the bridge portion supporting member 4.

Furthermore, in the camera module of this embodiment, the supporting part 4b of the bridge portion supporting member 4 is formed to have resiliency. Therefore, by adding a spring constant of the supporting part 4b to a spring constant of the bridge portion 5c of the upper leaf spring 5, it is possible to apparently change a spring constant of the upper leaf spring 5.

Furthermore, in the camera module of this embodiment, each of the supporting parts 4b of the bridge portion supporting member 4 has an extending part 4c which extends from each supporting part 4b along the extending direction of the bridge portion 5c of the upper leaf spring 5. By appropriately selecting an extending length of the extending part 4c, it is possible to easily adjust the resiliency of the supporting part 4b.

Furthermore, in the camera module of this embodiment, the bridge portion supporting member 10 for the lower leaf spring 11 serves as a magnetic flux blocking member which blocks leakage of magnetic flux from the yoke 6. Therefore, since it is not necessary to provide an additional component for a magnetic flux blocking member, a number of necessary components can be reduced.

Moreover, in the camera module of this embodiment, the lower leaf spring 11 is rotatably supported on the bridge portion supporting member 10. This makes it possible for the bridge portion supporting member 10 to have other function such as the magnetic flux blocking member as described above.

In the foregoings, the present invention has been described based on the embodiment shown in the drawings having the upper and lower leaf springs and the bridge portions supporting members. However, the materials, shapes and sizes of the upper and lower leaf springs and the bridge portions supporting members are merely one example thereof, and they may be changed appropriately if necessary. Further, in the embodiment described above, the upper leaf spring and the bridge portion supporting member or the lower leaf spring and the bridge portion supporting member are configured so that they are relatively rotatable with respect to each other. However, in the present invention, it is sufficient if the upper leaf spring and the bridge portion supporting member or the lower leaf spring and the bridge portion supporting member are configured so that they can be relatively moved, namely, the relative rotational movement of the embodiment is not essential.

Finally, it should be understood that the present invention is not limited to the preferred embodiments described hereinabove and, needless to say, a variety of modifications or variations may be made without departing from the scope of the invention defined in the following claims.

Further, it is also to be understood that the present disclosure relates to subject matter contained in Japanese Patent Application No. 2006-236884 (filed on Aug. 31, 2006) which is expressly incorporated herein by reference in its entirety.

What is claimed is:

1. A camera module, comprising:
    a lens unit which constitutes an optical system of the camera module;
    a holder which houses the lens unit and is displaceable along an optical axis direction of the lens unit;
    a coil provided on the holder;
    a yoke and magnets provided on the yoke for providing a magnetic field to the coil;
    at least one leaf spring for supporting the holder, the leaf spring including an outer annular portion, an inner annular portion provided inside the outer annular portion so as to be displaceable with respect to the outer annular portion and attached to the holder, and a plurality of bridge portions coupled between the outer annular portion and the inner annular portion;
    an imaging element provided below the lens unit; and
    bridge portion supporting means for supporting a part of each of the plurality of bridge portions, wherein movement of the bridge portion supporting means relative to the at least one leaf spring results in parts of the bridge portions of the leaf spring contacting the supporting means to change, which causes a load characteristic of the leaf spring to change.

2. The camera module as claimed in claim 1, wherein the bridge portion supporting means includes a ring-shaped annular portion and supporting portions which protrude inside the annular portion so as to support the bridge portions of the leaf spring, and the bridge portion supporting means rotatably and concentrically provided with respect to the leaf spring so that the load characteristic of the leaf spring can be changed.

3. The camera module as claimed in claim 2, wherein the supporting portions of the bridge portion supporting means are formed so as to have resiliency.

4. The camera module as claimed in claim 2, wherein each of the supporting portions of the bridge portion supporting means has an extending part which extends from each supporting portion along the extending direction of the bridge portion of the leaf spring.

5. The camera module as claimed in claim 2, wherein the bridge portion supporting means serves as a magnetic flux blocking member which blocks leakage of magnetic flux from the yoke.

6. The camera module as claimed in claim 1, wherein the leaf spring is rotatably supported on the bridge portion supporting means.

* * * * *